(12) United States Patent
Amir et al.

(10) Patent No.: US 9,396,448 B2
(45) Date of Patent: Jul. 19, 2016

(54) DISTRIBUTED AND OPEN SCHEMA INTERACTIONS MANAGEMENT SYSTEM AND METHOD

(71) Applicant: NICE-SYSTEMS LTD., Ra'anana (IL)

(72) Inventors: Roi Amir, Kfar Yona (IL); Yosef Golan, Askhelon (IL); Zach Beniash, Shoham (IL); Eyal Strassburg, Hod HaSharon (IL); Michal Bar, Beit Izhak (IL)

(73) Assignee: NICE-SYSTEMS LTD., Ra'Anana (IL)

( * ) Notice: Subject to any disclaimer, the term of this patent is extended or adjusted under 35 U.S.C. 154(b) by 205 days.

(21) Appl. No.: 14/022,937

(22) Filed: Sep. 10, 2013

(65) Prior Publication Data

US 2015/0074043 A1    Mar. 12, 2015

(51) Int. Cl.
*G06F 17/30* (2006.01)
*G06Q 10/06* (2012.01)

(52) U.S. Cl.
CPC .................................... *G06Q 10/06* (2013.01)

(58) Field of Classification Search
CPC .... G06F 19/24; G06F 17/30; G06F 17/30569
See application file for complete search history.

(56) References Cited

U.S. PATENT DOCUMENTS

| | | | |
|---|---|---|---|
| 7,197,489 B1 * | 3/2007 | Gauvin et al. | 707/999.102 |
| 8,805,849 B1 * | 8/2014 | Christensen | G06F 17/30286 707/640 |
| 2006/0212486 A1 * | 9/2006 | Kennis et al. | 707/200 |
| 2006/0271507 A1 * | 11/2006 | Anzalone et al. | 707/2 |
| 2007/0038651 A1 * | 2/2007 | Bernstein et al. | 707/100 |
| 2010/0318370 A1 * | 12/2010 | Bhattacharyya et al. | 705/1.1 |

* cited by examiner

*Primary Examiner* — Yuk Ting Choi (57) ABSTRACT

A system or method may receive, on a distributed computing system comprising a plurality of computing nodes, raw interaction data describing at least one interaction between two or more parties. The distributed computing may implement a map-reduce algorithm to map the raw interaction data into one or more entities, wherein each entity describes an attribute of an interaction. The distributed computing system my further update an interaction table to include each of the entities, wherein entities describing attributes of the same interaction are correlated.

24 Claims, 6 Drawing Sheets

DISTRIBUTED AND OPEN SCHEMA INTERACTIONS MANAGEMENT SYSTEM AND METHOD

FIELD OF THE PRESENT INVENTION

The present invention relates to managing and processing data from interactions, for example events where two parties exchange information.

BACKGROUND

In an interaction two (or more) parties may exchange information. In an interaction a person may exchange information with another person or, for example, an automated process such as a chat bot. An interaction may be, for example, between a customer and service representative. Data from a single interaction may not always be collected at the same time. Data may arrive in different fragments or at different times, especially if a large number of interactions are recorded. Further, different data consumer applications may desire to analyze or process the interactions in different ways. Exporting the interaction data using a predefined output format may be inflexible for these different data consumer applications.

SUMMARY

A system or method may receive, on a distributed computing system comprising a plurality of computing nodes, raw interaction data describing at least one interaction between two or more parties. The distributed computing may implement a map-reduce algorithm to map the raw interaction data into one or more entities, wherein each entity describes an attribute of an interaction. The distributed computing system my further update an interaction table to include each of the entities, wherein entities describing attributes of the same interaction are correlated.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, the "web" may refer to the World Wide Web, which may include the Internet and/or an Intranet. The web may be used interchangeably with the Internet and/or Intranet, as the web is a system of interlinked hypertext documents and programs (e.g., VOIP (voice over Internet protocol) telephone programs, streaming media programs) accessed via the Internet and/or Intranet.

When used herein, a "distributed" file system or computing system may include any cluster or network of computers used to perform computing tasks, such as logic, processing, reading/writing of data, or other tasks. The network of computers may be connected through an internal intranet or public internet. The network of computers may be connected to a central or master processor which assigns tasks to each computer on the network, or node. Each computer may further include their own processors to perform tasks locally. Distributed processing systems may be especially suitable for processing large data sets, since the tasks distributed on each node may be processed in parallel. A programming model for processing large data sets on distributed systems may be the map-reduce method, a well-known method in the prior art. The map-reduce method may include steps of "mapping" input data into smaller units to be processed across multiple computing nodes and then "reducing" the processed input to form output data. Reducing may include aggregating the processed data units from the computing nodes and outputting the combined data.

Embodiments of the invention provide a system and method for managing, processing, or aggregating interaction data, and allowing other data consumer applications, such as categorization services or interaction exporters, to consume or extract data describing the interactions in a way that may be adapted to the applications' needs. Embodiments of the invention may be implemented on a distributed computing system, using the map-reduce method, allowing parallel processing and publishing of the interaction data, so that the interaction data is available for other applications to consume data soon after.

Interactions may be recorded between a customer and one or more agents or service representatives over the multiple communication channels, such as the customer accessing an online support website, calling a call center, text messaging (communicating via text messaging), or through social media websites such as the Facebook social networking service, the Twitter social networking service, or the Foursquare social networking service, for example. The recorded interactions may have many different media types, such as, voice recordings, SMS messages, web screenshots, etc. The recorded interactions may be stored as raw data or may be processed, for example, by extracting information from the interactions according to predefined rules and known analytical methods. An interaction via the Internet between two parties may be any communication occurring between devices via the Internet. The interaction performed by the target may facilitate communication between two parties which are human users, such as a customer and a service representative, or allow a user to access content or media on the web, and may be between a human and a party which is an automated process (e.g., some interactions may only have one participant). For example, a user or customer may have questions about a service, and ask questions to a chat bot or automated chatting service that provides answers to the customer. A single user may also be one party interacting with another party that is a computer or device controlled by an organization, such as by completing a survey. Communication between people on the Internet may include e-mail messages, instant messaging, blogging, VOIP or posting messages on social networking websites. Accessing content on the web may include browsing news websites, accessing video content, or downloading music content. Other forms of interactions may occur between parties. Although some embodiments are directed to interactions between a customer and customer service representatives, the data managing process disclosed may be applied to other kinds of interactions across different communication channels, such as interactions during transactions, or multi-party discussions and negotiations between businesses.

In an interaction, two or more people may exchange information, or a person may exchange information with an automated process such as a chat bot. The interactions may occur across different types of communication channels including, for example, Internet, Intranet, public network, private network, local area network, wide area network, messaging via text messaging, short message service (SMS) messaging, e-mail messaging, blogs or micro-blogs, radio, and telephone or calling channels. Within one interaction, for example, multiple communication channels may be used. For example, an interaction may include a telephone call conducted via the Internet on one channel, a web-browsing session which may take place on a second channel, and a text interaction which may take place on a third channel Since many interactions may occur simultaneously or contemporaneously at a call center or other business site, for example, segments or fragments of interaction data which make up an interaction occurring on different communication channels may arrive at a data processing center at different times. Rather than waiting for every interaction segment to arrive, embodiments of the invention may be able to process and handle these interaction data segments as they arrive, allowing other data consumer applications to begin analyzing interactions before the full interaction is received, stored and processed.

According to embodiments of the invention, a data processing or management system may receive raw interaction data on a distributed file system. The distributed file system may utilize a plurality of computing nodes. Many distributed filing systems exist, including, for example, the Hadoop framework. Hadoop may provide a software framework that allows for the distributed processing of large data sets across clusters of computers using a simple programming model. Hadoop may be designed to scale up from a single server to thousands of machines, each offering local computation and storage. Instead of relying on the hardware of a few computers to deliver high-availability services, the Hadoop framework may detect and handle failures at the application layer, thus allowing a highly-available service on top of a cluster of computers, each of which may have risks for failures. Further, performance may be linearly scaled based on how many nodes are utilized in processing. For example, adding nodes may reduce performance time in a linear and predictable manner.

Raw interaction data may be extracted or processed information from each interaction, according to known content analysis methods, such as text and speech extraction. Raw interaction data may include metadata from an interaction segment or content from the interaction. If the interaction occurs over the Internet, the raw interaction data may be extracted from IP data packets or html, for example. The raw interaction data may be pre-processed so that it can be read and evaluated by embodiments of the system and method described herein. Raw interaction data may result from speech processing the recording of an interaction, such as a call over the telephone, or text processing a conversation over Twitter, for example. The raw interaction data may be received by a system having different formats or structure due to the different types of content included. For example, e-mail interaction data may have a different format than Skype interaction data.

Embodiments of the invention may provide a system or method for efficiently storing, handling, and publishing recorded interactions, which can then be processed or consumed by data consuming applications. The system may receive raw interaction data describing one or more interactions between customers and agents. The raw interaction data may be in portions or segments, which may be part of a group of interactions. Embodiments of the invention may implement the map-reduce algorithm, where raw interaction data may be mapped or linked to an entity and stored on a distributed file system. The entity may describe, for example, characteristics or attributes related to the interaction from which it is mapped, such as participants of the interaction, duration, or category of the interaction, for example. Entities may be saved or stored in distributed memory via an interaction table. (See, e.g., memory 130b in FIG. 1). An interaction table on the distributed file or computing system may "reduce" the mapped entities by updating previously stored interactions with each mapped entity, or create new interaction files with the mapped entities. The mapped entities may be made available for data consumer application to process, analyze, or consume interactions. Entities may be mapped based on entity schemas, mapping schemas, and raw schemas. A schema manager, for example, may receive input from a user to define or describe each of the entity schemas, mapping schema, and raw schemas. The schema manager may take an Extensible Markup Language (XML) file as input, or any other file in a mark-up language. A schema may be a template of interaction data that lists common characteristics, attributes, or structure of different types of interaction data. Schemas may be edited or changed more easily than source code for processing new types of interaction data, due to inheritance hierarchies.

For example, a "message" schema may include the following characteristics: from, to, title, and body. A more specific schema for e-mail may further include time sent and time received, and may inherit the same characteristics of the message schema, based on the hierarchy. The schemas for each type or form of interaction data may be organized hierarchically so that similar interaction data types that share the same fields of data may relate to the same schema file, if desired for simplicity. The hierarchy may also allow efficient additions of new interaction data types. For example, a social media interaction schema may be placed higher in the hierarchy than more specific interactions, such as a Facebook interaction or a Twitter interaction. A user or analyst may have the option of using the social media interaction schema for all social media interactions, or the user may wish to specifically include separate schemas for specific types of social media interactions, such as a schema for Twitter interactions and a schema for Facebook interactions, while inheriting the more general characteristics of the social media interaction schema. The hierarchy may allow the same rules and categories to be applied across interactions of the same schema. For example, in all social media interactions, interactions may be categorized as "within network" (e.g., within a user's social network) or "out of network" (e.g., outside a user's social network). However, Twitter interactions may specifically include a category for "retweets" or "favorites", features that are unique to Twitter's social network. The hierarchy may allow all social media interactions to be assigned a "within network" or "out of network" category without the need for adding additional schema files even if interactions on new social media networks are evaluated. The hierarchy may allow flexibility for a user or analyst to categorize interactions based on specific features of a social media network, such as Twitter. For each schema, the schema manager may generate classes for an object-oriented computer language, such as the Java or C++ programming languages, for example.

Figure 1:
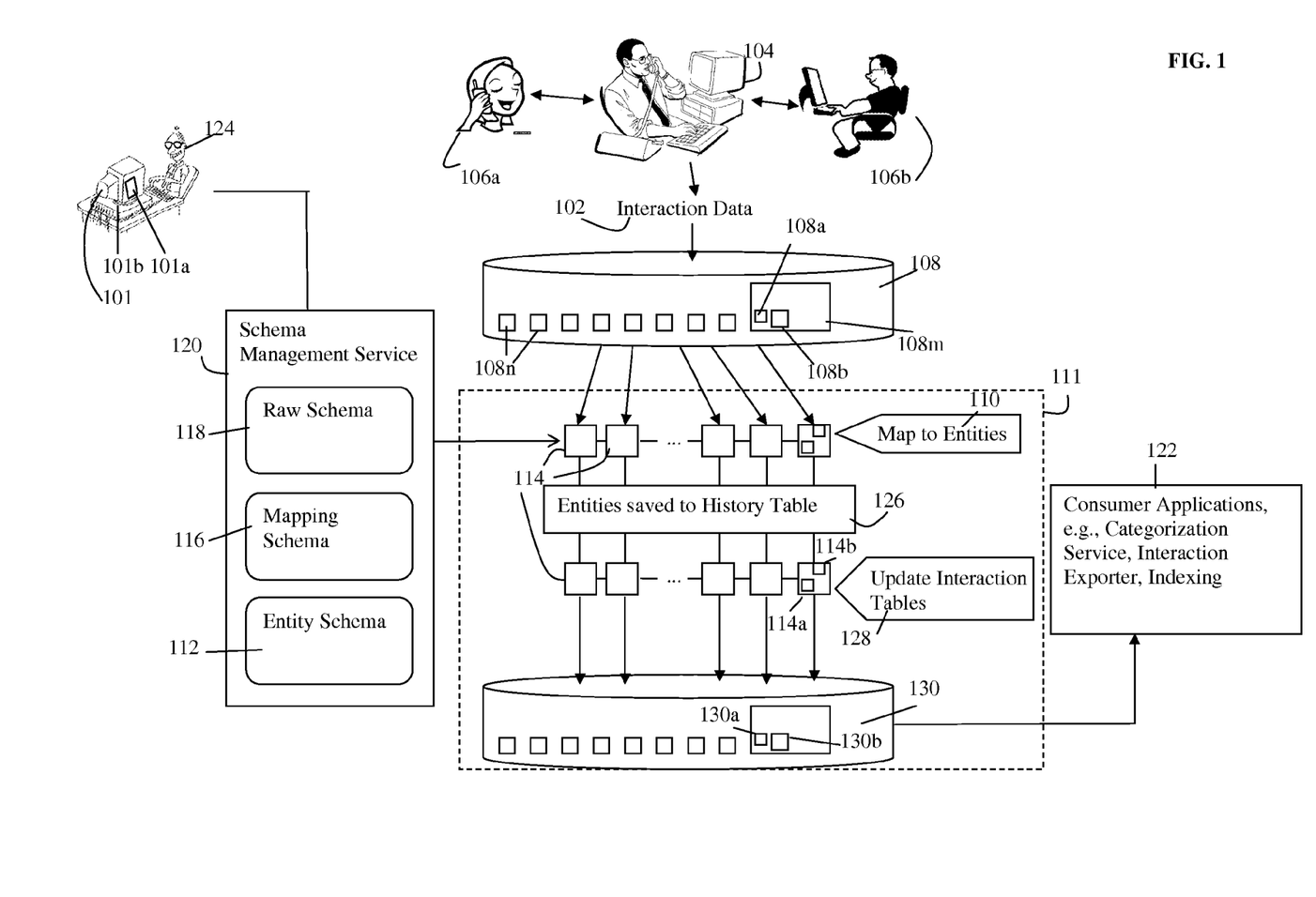
FIG. 1 is an illustration of a distributed and open schema interactions management system, according to embodiments of the invention.

FIG. 1 is an illustration of a system, according to embodiments of the invention. The system 100 may receive interaction data 102 generated by interactions between a customer service representative 104 and a customer 106a, 106b. Other types of parties may interact and generate interaction data 102 from recorded interactions. The interaction data 102 may be generated through multiple types of communication channels, such as via telephone lines (as shown between customer 106a and representative 104) or via the Internet or web (as shown between customer 106b and representative 104), or both channels. Other channels may be used, such as VOIP or facsimile, for example. The interaction data may be received by a distributed file system 108, for example. The distributed file system 108 may process the interaction data across multiple computing nodes 108n. The distributed file system 108 may include a master node 108m that distributes the task of writing the interaction to a local storage across the nodes 108m. The master node 108m may include a local processor 108a and memory 108b to distribute computing tasks. Each computing node 108n included in distributed storage system 108 may include a local processor and memory similar to master node 108m.

Distributed file system 108 may distribute processing of interaction data across multiple nodes 114 to map the interaction data into entities 110 through parallel processing. The computing nodes 114 may be different from nodes 108n or they may use the same processing resources. The computing nodes 114 may each have local processors 114a and memory 114b. The entities may describe an attribute or characteristic of an interaction, such as an interaction's participants, duration, or customer sentiment, for example. The entities may be mapped based on entity schemas 112, raw schemas 118, and mapping schemas 116. A schema management service 120 may manage and record all known schemas in the system and how the schemas are related in a hierarchy. As further described in FIG. 2 the entity schemas 112, raw schemas 116, and mapping schemas 116 may describe the structure and characteristics of interaction data for mapping into entities. The schemas 112, 116, and 118 may be edited by a user, engineer, or analyst 124 of the system of FIG. 1, depending on the type of entities (e.g., characteristics or attributes of interactions) that data consumer applications 122 require. A computer 101, including a processor 101a and memory 101b, may be accessed by user 124 to define schemas of interaction data in a schema manager 120. The user 124 may write schemas in a markup language such as XML, and input or edit the files into schema management service 120. Schema management service 120 may include a user interface. When discussed herein, a processor which may carry out all or part of a method as discussed herein, may be configured to carry out the method by, for example, being associated with or connected to a memory storing code or software which, when executed by the processor, carry out the method.

An interaction service 111 may implement a map-reduce algorithm to first map or categorize the input interaction data into entities based on the schemas in the schema management service 120, and then reduce the entities by updating interaction tables 128 with the mapped entities. Entities may be saved to a history table 126, which may include every entity mapped from input files. Once entities have been mapped, the system of FIG. 1 may begin the reducer process by updating interaction tables with the entities mapped from new interaction data. The interaction tables may include interaction data that was previously processed from a different input file. As an example, one interaction between a customer and a service representative may be for (e.g. have as a subject) troubleshooting a device that the customer believes is not working properly. The customer and service representative may speak on the telephone, the service representative may send an e-mail message to the customer including a troubleshooting document, and the customer may speak to the service representative a second time to inform them that the device is fixed. However, each segment of the interaction (e.g., the two telephone calls and the e-mail) may arrive at the system of FIG. 1 in different input files, for example, the two telephone calls may arrive in one file, and the e-mail message may arrive in another file. If the telephone calls had been previously filed first, the interaction table may store the two telephone calls as two entities describing the same interaction. For the second file, the e-mail message may be mapped to an e-mail entity, and then the interaction table may be updated or added to include the e-mail entity describing the same interaction as the telephone calls.

The system of FIG. 1 may create a new table for each updated interaction table, and each updated interaction table may be stored in a distributed file system 130, with computing nodes having local processors 130a and memory 130b. Previous interaction tables may not be immediately discarded due to their use by data consuming applications 122, however, they may be discarded once data consuming applications have started processing the newly updated interaction tables.

Computers 101, 108, and 114 may each include one or more controller(s) or processor(s) 101a, 108a, and 114a, respectively, for executing operations and one or more memory unit(s) 101b, 108b, and 114b respectively, for storing data and/or instructions (e.g., software) executable by a processor. Processors 101a, 108a, and 114a may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 108b, 114b and/or local caches and memory in cluster nodes 108 and 114 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Computer 101 may include one or more input devices, for receiving input from a user or agent (e.g., via a pointing device, click-wheel or mouse, keys, touch screen, recorder/microphone, other input components) and output devices for displaying data to a customer and agent, respectively.

Figure 2:
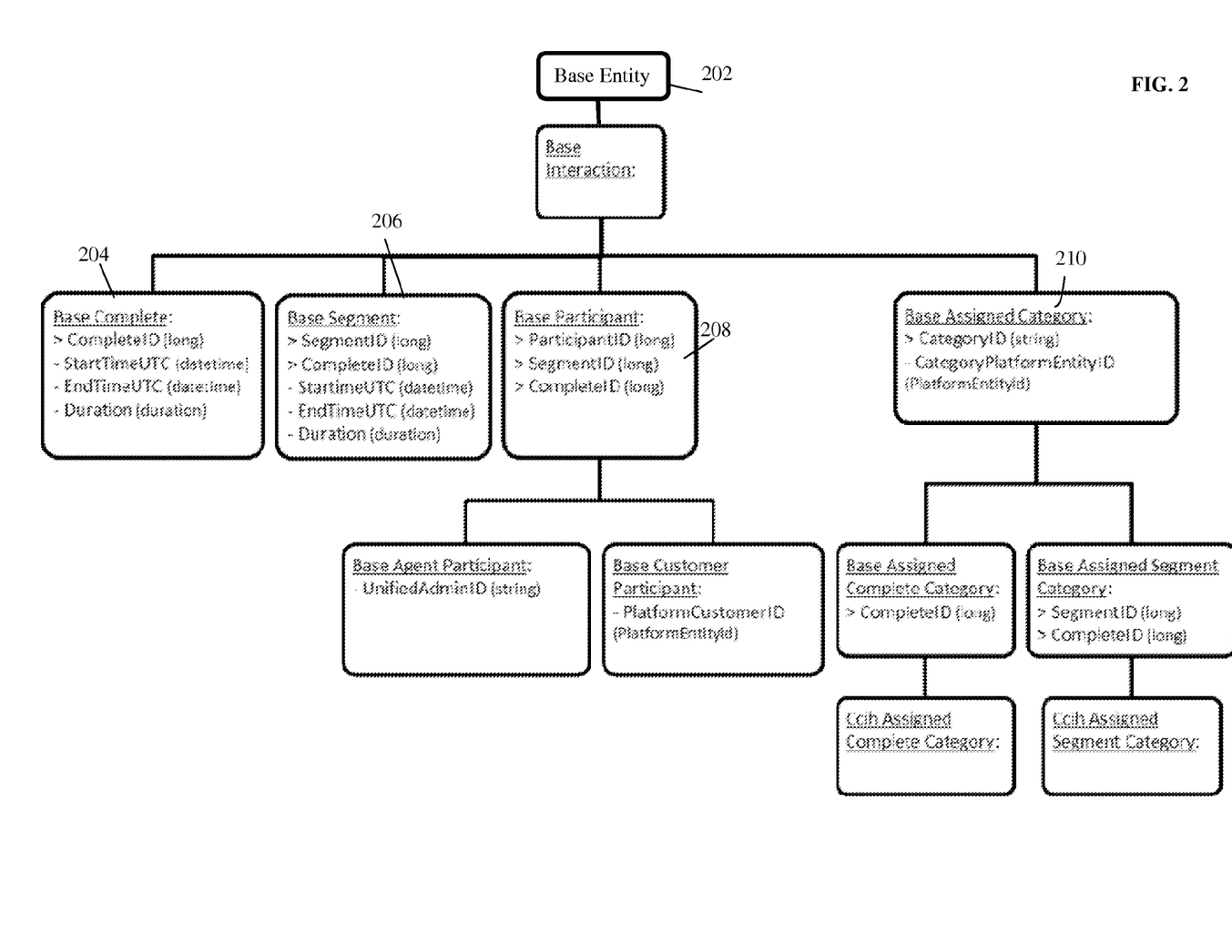
FIG. 2 is an illustration of the hierarchy of a base entity schema, according to embodiments of the invention.

FIG. 2 is an illustration of the hierarchy of a base entity schema, according to embodiments of the invention. As explained above, a single interaction may be described by a plurality of entities. The structure or characteristic of an interaction that each entity describes may have a basic template, as defined by the entity schema. Each entity schema may inherit attributes or characteristics from a default base entity schema 202 that may be pre-configured. Base entity schema 202 may define the default characteristics of every interaction. For example, as shown, every interaction may include a complete 204, segment 206, participant 208, and assigned category 210 characteristic. Each characteristic may include data that may explain the different characteristics. For example, the complete 204 characteristic may include an identification ("ID"), start time, end time, and duration, which explains a complete interaction. The complete 204 characteristic may be created when an entity of a new interaction is mapped, which may act as a place holder for other entities that are mapped from later input files. The segment 206 characteristic may include an ID, the ID of the related complete interaction, start time, end time, and duration, which explains a segment of an interaction. If a user desires to add a new entity to describe a new type of communication channel, the user may add an entity schema which inherits from one of the base interaction entities. For example, if a user wishes to include recipients of an e-mail which were carbon copied as an entity that describes an e-mail interaction, the user may create a new entity schema which inherits from the participant 208 schema.

Entity schemas may include for example the following parameters:
Schema Level:
    Name—the name of the schema
    Version—the version of the schema
    Group—group name, descriptive only, good for filtering.
    Base Schema—the name and value of the inherited schema
Members: Describes the Variables
    Name—variable name
    Type—type of the value, such as integers, strings, booleans or a complex one like XML, JSON
    Enum—Enum name, in order to validate the values, this parameter might have an enum (as in development languages) that contains all its possible values.
    Description—A small description on the parameter.
    Reference—in order to relate different entities—for example customers to an interaction segment. The value is inserted in this format [schema name].[member name]
    Key—mark a field as a key in order to understand how to store the rows and whether some data (row) is override by a newer row or that they should reside one by the other.

Figure 3:
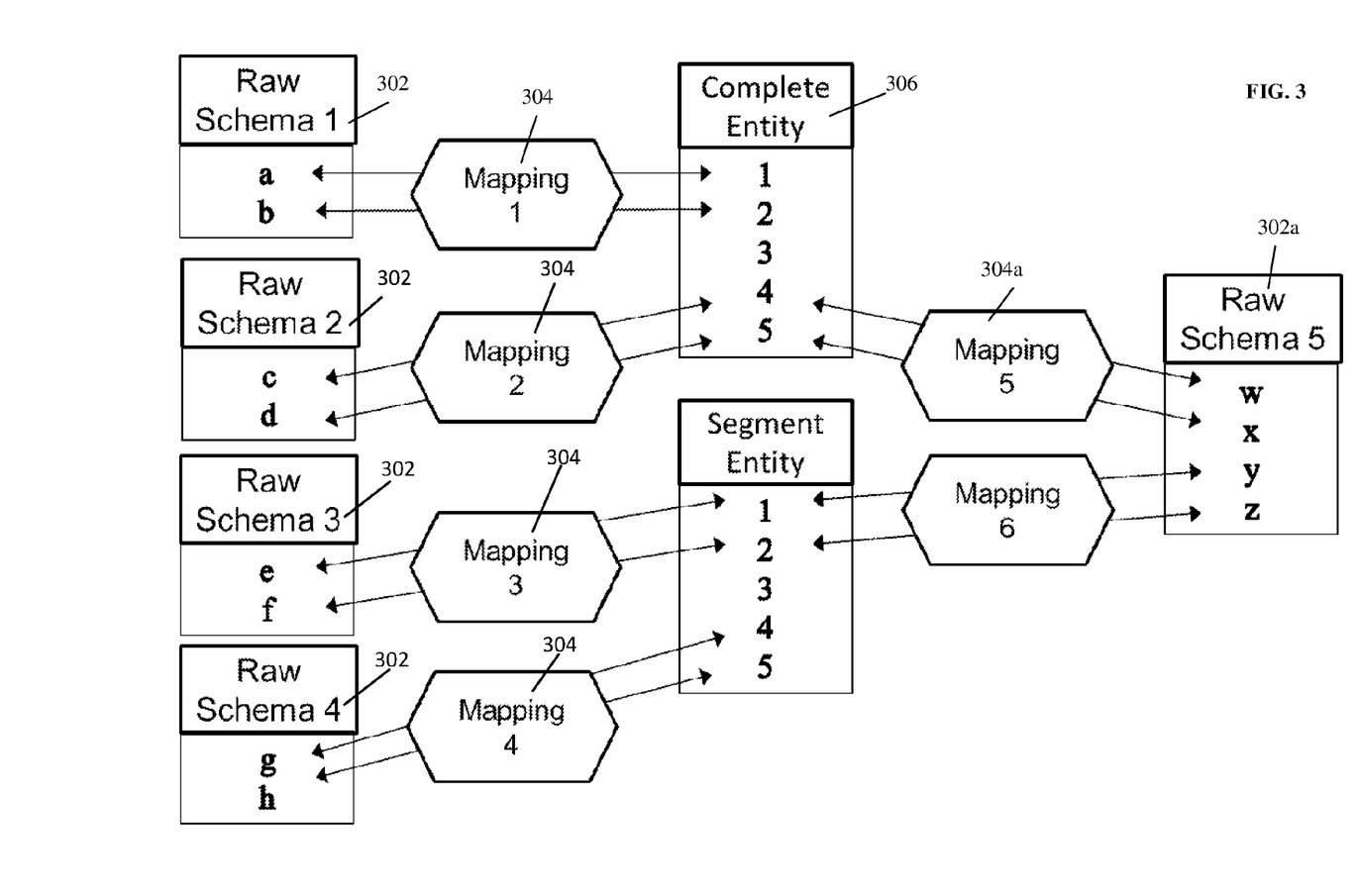
FIG. 3 is an illustration of the relationship between raw schemas, mapping schemas and entity schemas, according to embodiments of the invention.

FIG. 3 is an illustration of the relationship between raw schemas 302, mapping schemas 304 and entity schemas 306, according to embodiments of the invention. Raw schemas 302 describe an input file of raw interaction data that may be imported into the system. A file may be imported by extract-transform-load processes from external sources, or as an export file from a categorizations service (or from other data consumer applications). The raw schema 302 may include the following parameters:
Schema Level:
    Name—the name of the schema
    Version—the version of the schema
    Delimiter—The default delimiter that separates the different values. It is usually "," or "|". It could be overwritten in run time.
    Type—The default file type. It could be overwritten in run time. It could be a csv file, binary file, sequence file or other files types that Hadoop's map/reduce can read.
    Base Schema—the name and value of the inherited schema
Members: Describes the Variables
    Name—variable name
    Type—type of the value. Could be a primitive type like integers, strings, booleans or a complex one like XML, JSON
    Description—A small description on the parameter.
    Nullable—whether this parameter is mandatory or not.

Figure 4:
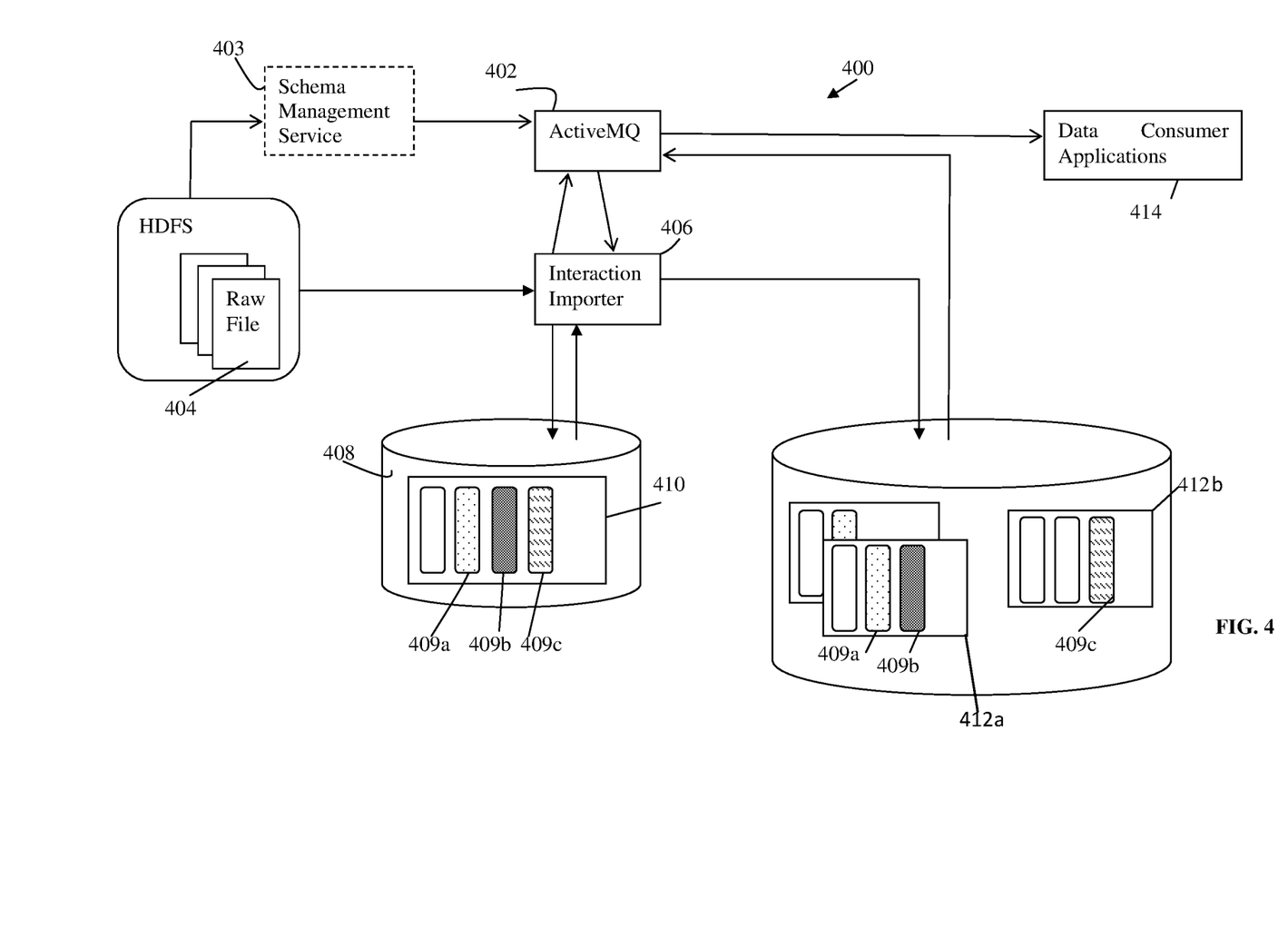
FIG. 4 is a flow diagram of an interaction service, according to embodiments of the invention.

For each entity schema 306 and raw schema 302, a mapping schema 304 describes the map between a single property of an entity schema 306 to a single property in the raw schema 302. For example, as shown in FIG. 3, mapping schema 304a may describe the map between properties 4 and 5 of complete entity 306 and properties w and x in raw schema 5. It may be possible to map a single Raw Schema to multiple Entities, and vice versa. The mapping schema may include the following properties:
Schema Level:
    Name—the name of the mapping schema
    Version—the version of the mapping schema
    Raw Schema—the name and value of the raw schema
    Entity Schema—the name and value of the entity schema
    Base Schema—the name and value of the inherited schema
Members: Describes the Variables (Columns)
    Entity Variable Name—name of the member name inside the entity schema
    Raw Variable Name—name of the member name inside the raw schema FIG. 4 is a flow diagram of an interaction service 400, according to embodiments of the invention. A message broker, such as Apache's ActiveMQ 402 program, may be used to route messages between the schema management service and the interaction service. For every raw input file 404, the schema management service 403 (performed by, e.g., distributed computing processors 114 in FIG. 1) may send messages to the interaction service 400 via ActiveMQ 402. Each message may inform the interaction service of which entities may be read from a file. For example, if an input file having a schema called "NimSegmentRawData" is mapped to an entity schema called "NimSegment" (which, by default, may inherit from BaseSegment in FIG. 2), schema management service may publish, send, or transmit four messages via ActiveMQ 402 for "NimSegment", "BaseSegment", "Base Interaction", and "BaseEntity", which follows the hierarchy of entities illustrated in FIG. 2, for example.

An interaction importer 406, part of interaction service 400, may receive messages from the schema management service 403 via ActiveMQ 402 to determine which entity schemas may be used to map or extract entities from raw interaction data files 404. The entity schemas may be identified by name or version number or both, or may be identified by other means. A mapper of the map-reduce implementation may read a row from the raw input file 404 and convert the data inside the row into an entity 409a-c, using a schema that available by the schema management service. Each mapped entity 409a-c may be stored in a distributed storage system 408 which may include a history table 410. The interaction importer 406 may add some information about the original input file 404 as a source of this interaction, and also adding the entity schema name and version to this row.

In one embodiment, two kinds of rows or entities may appear in history table 410:
1. Complete row with a key like <SystemID>|<CompleteID>|-1, containing all of the member values that has been received as part of the Complete schema+fields of assigned categories for this complete.
2. Segment row with a key like <SystemID>|<CompleteID>|<SegmentID>, containing all of the member values that has been received as part of the Segment schema+fields of Customers, Agents and assigned categories for this complete interaction.

Entities that describe the same interaction may be correlated or matched by having the same CompleteID, for example. Other methods of matching or correlation may be used.

In FIG. 4, interaction importer 406 may map or categorize three entities 409a, 409b, 409c from raw interaction data file 404 and store them to history table 410. Entities in history table 410 that describe the same interaction may be correlated by an identifying number or key assigned to the entity through the mapping process. Once mapping is complete, reducers may begin updating interaction tables 412a and 412b to include the mapped entities 409a-c. Reducing may occur on master computer nodes charged with distributing computing or processing tasks. For example, entities 409a and 409b may describe the same interaction. Interaction table 412a may be updated or added to include 409a and 409b. A new interaction table may be created for each updated entity, e.g., 412a and 412b, as shown. Alternatively, one new interaction table may be created to include both new entities 409a and 409b. Entity 409c may be added to a separate interaction table 412b, describing a different interaction than entities 409a and 409b. Interaction importer 406 may determine which interaction table to update, based on the CompleteID of the entity, for example. Other ways to correlate or associate entities describing the same interaction may be used. For example, entities may be correlated by other mapped or assigned characteristics, such as category.

When the reducers have finished updating the interaction tables, the schema management service 403 (performed by, e.g., computer or processor 101a in FIG. 1) may send a message to ActiveMQ 402 informing data consumer applications 414 that interaction tables are ready for processing. The message may inform the data consumer application 414 of the newly mapped entities that have been added to the interaction table. Data consumer applications 414 may include different kinds of data consumers. Non-limiting examples include:

- A Categorization Service may run a separate map-reduce job that performs distributed categorization engine on those interactions.
- An Interaction Exporter, which is another part of Interaction Service, may export new files to be consumed by external services, such as ETL programs of a Data Mart for reporting. The creation of the export files may be done by a map-reduce program that reads the update table in parallel.
- An Indexing Map/Reduce job may index interactions into predefined index tables.

Other data consumer applications may be applicable.

Figure 5:
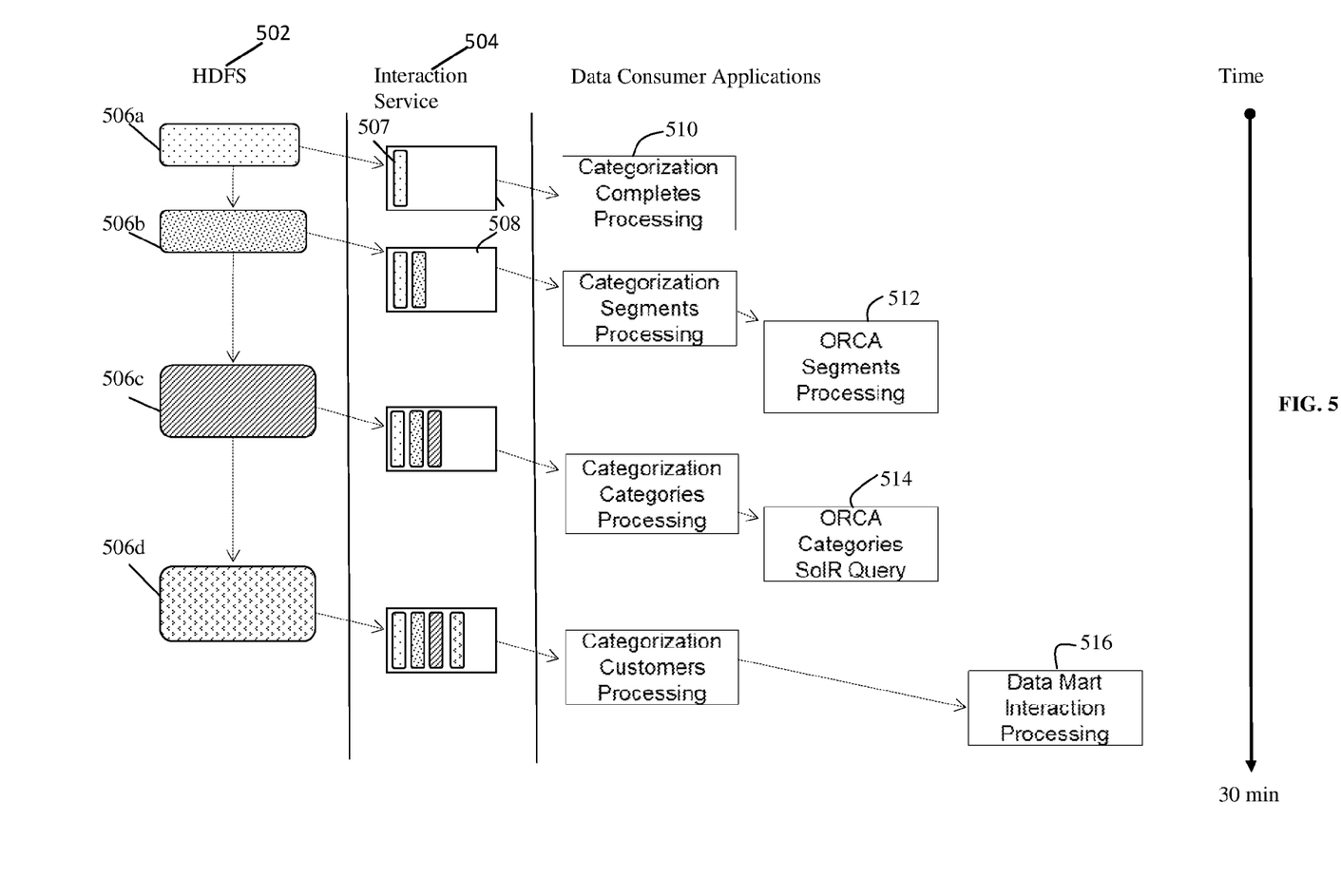
FIG. 5 is a timeline of processing interactions, according to embodiments of the invention.

FIG. 5 is an example timeline of processing interactions, according to embodiments of the invention. Using a distributed file system 502 and interaction service 504, data consumer applications may be able to process interactions sooner, without having to wait for an entire interaction to be handled and stored. As an example, four separate input files 506a-d may include information about one interactison 508. The input files may include information about other interactions, but one interaction is discussed here for illustration purposes. After the first file 506a is mapped into entities, and a relevant entity 507 is updated in the appropriate interaction table, a categorization service 510 may begin processing the first entity of an interaction. After the second file 506b is mapped into entities, and an updated interaction table 508 includes a new entity, a categorization service 510 or other data consumer application may begin consuming the updated interaction and processing data. In this way, it may be possible for certain data consuming applications to complete processing in parallel with importing interaction data. Data consuming applications may include analytic engines such as performance monitoring software called ORCA 512, which may use statistical algorithms to determine the root cause for the interactions; Solr 514, an open source enterprise search platform from Apache which may provide scalable indexing services; or a data warehouse such as a Data Mart 516 that may optimally generate ad-hoc and off the shelf interaction reports.

Figure 6:
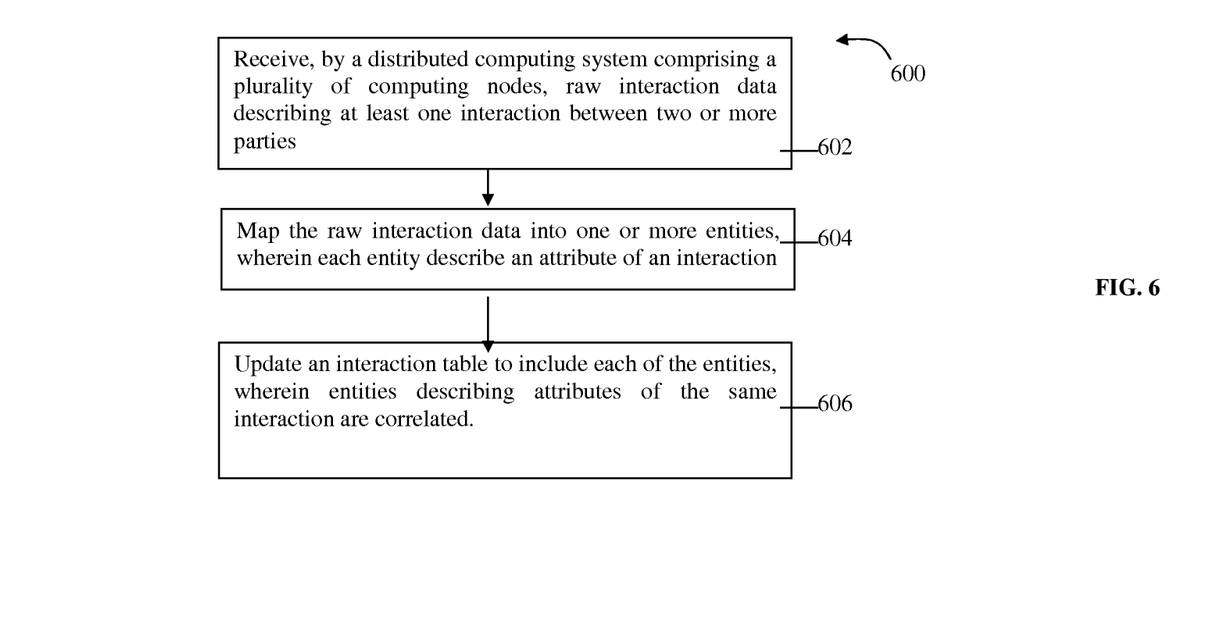
FIG. 6 is a flowchart of a method, according to embodiments of the invention.

FIG. 6 is a flowchart of a method, according to embodiments of the invention. In operation 602, a system, such as a distributed computing system comprising a plurality of computing nodes, may receive raw interaction data describing at least one interaction between two or more parties. The raw interaction data may be metadata, for example, in different formats due to the different types of communication channel generating the raw interaction data. Schemas, such as a raw schema, may be used to interpret different formats of raw interaction data. A processor may receive input from a user that describes or edits schemas. The raw interaction data may be received in portions or fragments, and the fragments may come from different interactions.

In operation 604, the raw interaction data may be mapped into one or more entities. Each entity may describe an attribute or characteristic of an interaction, such as the participants, interaction sentiment, or duration. The mapped entities may be based on mapping schemas or entity schemas, for example, describing a template of interaction data that lists common characteristics, attributes, or structure of different types of interaction data. Schemas may be edited or changed more easily than source code for processing new types of interaction data. Each mapped entity may be stored on distributed memory, for example, in a history table, by processors performing a mapping function of the map-reduce algorithm or routine.

In operation 606, an interaction table may be updated to include each of the mapped entities. In the history table, the mapped entity may include an identifier or key that corresponds to an interaction. The interaction table may be updated to include mapped entities that are correlated or identified with specific keys. A new interaction table including newly mapped entities may be created for each update. Data consuming applications may be able to process entities from the updated interaction tables. Updating interaction tables may be performed by processors performing the reducer function of the map-reduce algorithm or routine.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

What is claimed is:

1. A method, comprising:
receiving, by at least two computing nodes of a distributed computing system comprising a plurality of computing nodes, at least a first set and a second set of raw interaction data, each set of the first set and the second set of raw interaction data describing at least a portion of one interaction between two or more parties, the first set of raw interaction data and the second set of raw interaction data comprising different raw interaction data fields, the first set of raw interaction data having a first raw schema and the second set of raw interaction data having second raw schema;
distributing, by a first node of the plurality of nodes, a first portion of the first set of raw interaction data to at least a second node of the plurality of nodes, a second portion of the first set of raw interaction data to at least a third node of the plurality of nodes, a first portion of second set of raw interaction data to at least a fourth node of the plurality of nodes, a second portion of the second set of raw interaction to at least a fifth node of the plurality of nodes;
mapping, by the second node, the first portion of the first set of raw interaction data and a second portion of the second set of raw interaction data into one or more fields of a first set of one or more entities based on the first raw schema and the second raw schema, respectively;
mapping, by the third node, the second portion of the first set of raw interaction data and a first portion of the second set of raw interaction data into one or more fields of a second set of one or more entities based on the first raw schema and the second raw schema, respectively, wherein each entity of the first set and the second set describes an attribute of an interaction and includes one or more fields that are mandatory and one or more fields that are not mandatory for the respective entity;
updating an interaction table to include each of the first set of one or more entities and the second set of one or more entities, wherein entities describing attributes of the same interaction are correlated, wherein mapping the first portion of the first set of raw interaction data and a second portion of the second set of raw interaction data and updating the interaction data further comprise using Hadoop framework; and
for each entity of the first set of entities and the second set of entities having all fields that are mandatory populated, transmitting the respective entity to a corresponding application.

2. The method of claim 1, wherein mapping the first set of raw interaction data into the first set of one or more entities is based on at least one entity schema, one raw schema, and one mapping schema.

3. The method of claim 2, wherein the at least one entity schema inherits characteristics from a base interaction entity.

4. The method of claim 1, comprising storing each of the mapped entities into a history table on a distributed file system.

5. The method of claim 4 wherein processing, by the one or more consuming application, further comprises transmitting by the second node or the third node, an ActiveMQ message to the one or more consuming applications.

6. The method of claim 1, wherein mapping the raw interaction data and updating the interaction table are performed according to a map-reduce implementation.

7. The method of claim 1, comprising processing, via data consumer applications, entities from the updated interaction table.

8. The method of claim 1, wherein the mapped entities describe a participant or category of an interaction.

9. The method of claim 1, comprising receiving input from a user describing at least one entity schema based on a type of communication channel.

10. The method of claim 1, further comprising:
receiving, by the first node, the second node, the third node or another node of the distributed computing system, a third set of raw interaction data, the third set of raw interaction data describing a second portion of one interaction between two or more parties, the one interaction being a same interaction as the one interaction included in the first set of raw interaction data.

11. A system, comprising:
at least one processor configured to receive input from a user;
a distributed file system comprising a plurality of processors on a plurality of computing nodes, wherein the processors are configured to:
receive at least a first set and a second set of raw interaction data each set of the first set and the second set of raw interaction data describing at least a portion of one interaction between two or more parties, the first set of raw interaction data and the second set of raw interaction data comprising different raw interaction data fields, the first set of raw interaction data having a first raw schema and the second set of raw interaction data having second raw schema;
distribute, by a first node of the plurality of nodes, a first portion of the first set of raw interaction data to at least a second node of the plurality of nodes, a second portion of the first set of raw interaction data to at least a third node of the plurality of nodes, a first portion of second set of raw interaction data to at least a fourth node of the plurality of nodes, a second portion of the second set of raw interaction to at least a fifth node of the plurality of nodes;
map, by the second node, the first portion of the first set of raw interaction data and a second portion of the second set of raw interaction data into one or more fields of a first set of one or more entities based on the first raw schema and the second raw schema, respectively;
map, by the third node, the second portion of the first set of raw interaction data and a first portion of the second set of raw interaction data into one or more fields of a second set of one or more entities based on the first raw schema and the second raw schema, respectively, wherein each entity of the first set and the second set describes an attribute of an interaction and includes one or more fields that are mandatory and one or more fields that are not mandatory for the respective entity;
update an interaction table to include each of the first set of one or more entities and the second set of one or more entities, wherein entities describing attributes of the same interaction are correlated, wherein mapping the first portion of the first set of raw interaction data and a second portion of the second set of raw interaction data and updating the interaction data further comprise using Hadoop framework; and for each entity of the first set of entities and the second set of entities having all fields that are mandatory populated, transmit the respective entity to a corresponding application.

12. The system of claim 11, wherein the processors are configured to map the first set of raw interaction data into the first set of one or more entities based on at least one entity schema, raw schema, and mapping schema.

13. The system of claim 11, wherein the processors are configured to store each of the mapped entities into a history table on a distributed file system.

14. The system of claim 11, wherein the processors are configured to map the raw interaction data and update the interaction table according to a map-reduce implementation.

15. The system of claim 11, wherein the processors are configured to process, via data consumer applications, entities from the updated interaction table.

16. The system of claim 11, wherein the entities describe a participant or category of an interaction.

17. The system of claim 11, wherein the processor are configured to receive input from a user describing at least one entity schema based on a type of communication channel.

18. An apparatus, comprising:
at least one processor configured to receive input from a user describing entity schemas, mapping schemas, and raw schemas;
a distributed file system comprising a plurality of processors configured to:
receive at least a first set and a second set of raw interaction data each set of the first set and the second set of raw interaction data describing at least a portion of one interaction between two or more parties, the first set of raw interaction data and the second set of raw interaction data comprising different raw interaction data fields, the first set of raw interaction data having a first raw schema and the second set of raw interaction data having second raw schema;
distribute, by a first processor of the plurality of nodes, a first portion of the first set of raw interaction data to at least a second processor of the plurality of nodes, a second portion of the first set of raw interaction data to at least a third processor of the plurality of processors, a first portion of second set of raw interaction data to at least a fourth node of the plurality of nodes, a second portion of the second set of raw interaction to at least a fifth node of the plurality of processors;
map, by the second processor, the first portion of the first set of raw interaction data and a second portion of the second set of raw interaction data into one or more fields of a first set of one or more entities based on the first raw schema and the second raw schema, respectively;
map, by the third processor, the second portion of the first set of raw interaction data and a first portion of the second set of raw interaction data into one or more fields of a second set of one or more entities based on the first raw schema and the second raw schema, respectively, wherein each entity of the first set and the second set describes an attribute of an interaction and includes one or more fields that are mandatory and one or more fields that are not mandatory for the respective entity;
update an interaction table to include each of the first set of one or more entities and the second set of one or more entities, wherein entities describing attributes of the same interaction are correlated, wherein mapping the first portion of the first set of raw interaction data and a second portion of the second set of raw interaction data and updating the interaction data further comprise using Hadoop framework; and
for each entity of the first set of entities and the second set of entities having all fields that are mandatory populated, transmit the respective entity to a corresponding application.

19. The apparatus of claim 18, wherein the first one processor is to receive input from a user describing entity schemas based on a type of communication channel.

20. The apparatus of claim 18, wherein the entities describe a participant or category of an interaction.

21. The apparatus of claim 18, wherein the plurality of processors are configured to allow data consumer applications to process entities from the updated interaction table.

22. The method of claim 1 wherein at least a portion of the first set of one or more entities and at least a portion of the second set of the one or more entities are the same.

23. The method of claim 1 wherein the first set of raw interaction data represents a segment of information exchanged during an interaction between two or more people.

24. The method of claim 1 further comprising processing, by one or more consuming applications, each entity from the first set of one or more entities and the second set of one or more entities even if the received raw interaction data represents only a segment of information exchanged during an interaction between two or more people.

* * * * *